United States Patent [19]
Kim

[11] Patent Number: 6,021,448
[45] Date of Patent: Feb. 1, 2000

[54] DATA TRANSMISSION METHOD FOR HOST AND DATA RECEPTION METHOD FOR MULTIFUNCTION DEVICE

[75] Inventor: Kwang-Seuk Kim, Suwon, Rep. of Korea

[73] Assignee: Samsung Electronics, Co., Ltd., Suwon, Rep. of Korea

[21] Appl. No.: 08/933,757

[22] Filed: Sep. 23, 1997

[30] Foreign Application Priority Data

Sep. 23, 1996 [KR] Rep. of Korea ....................... 96/41715

[51] Int. Cl.[7] ...................................................... G06F 13/00
[52] U.S. Cl. ............................ 710/14; 710/19; 358/468; 379/100.06
[58] Field of Search ...................................... 395/834, 825, 395/821, 835–839, 882–884, 892–894; 710/1, 8–19, 62–64, 72–74; 358/296, 468; 379/100.03–100.06

[56] References Cited

U.S. PATENT DOCUMENTS

| 4,414,579 | 11/1983 | Dattilo et al. ............................. 358/467 |
| 5,086,455 | 2/1992 | Satomi et al. ...................... 379/100.16 |
| 5,233,167 | 8/1993 | Markman et al. ....................... 235/375 |
| 5,359,425 | 10/1994 | Maehara et al. ......................... 358/300 |
| 5,361,134 | 11/1994 | Hu et al. .................................. 358/296 |
| 5,365,364 | 11/1994 | Taylor ..................................... 359/208 |
| 5,383,030 | 1/1995 | Seo ........................................... 358/442 |
| 5,396,345 | 3/1995 | Motoyama ............................... 358/448 |
| 5,444,771 | 8/1995 | Ohnishi ............................... 379/100.16 |
| 5,459,579 | 10/1995 | Hu et al. .................................. 358/296 |
| 5,511,150 | 4/1996 | Beaudet et al. .......................... 395/113 |
| 5,517,552 | 5/1996 | Yamashita ............................... 455/556 |
| 5,530,558 | 6/1996 | Nachman ................................. 358/442 |
| 5,544,045 | 8/1996 | Garland et al. ............................. 704/3 |
| 5,608,546 | 3/1997 | Nakamura et al. ...................... 358/468 |
| 5,619,725 | 4/1997 | Gordon .................................... 395/839 |
| 5,642,409 | 6/1997 | Kotani et al. ....................... 379/100.15 |
| 5,684,607 | 11/1997 | Matsumoto ............................. 358/442 |
| 5,758,081 | 5/1998 | Aytac ................................. 395/200.42 |
| 5,778,162 | 7/1998 | Morisaki ................................. 395/113 |
| 5,796,494 | 8/1998 | Asano ..................................... 358/468 |

Primary Examiner—Christopher B. Shin
Attorney, Agent, or Firm—Robert E. Bushnell, Esq.

[57] ABSTRACT

A data transmission method for a host and a data reception method for a multifunction device are disclosed. Data of one mode are received from the host even when the multifunction device performs in a specific mode and returns again to a previous mode after reception of the data in the one mode, thereby providing no damage to the operation in the previous mode. The data transmission method for a host connected to a multifunction device includes the steps of: detecting the mode of the multifunction device corresponding to data in response to a data transmission command to the multifunction device; transmitting a signal indicative of the detected mode to the multifunction device; and transmitting the data to the multifunction device after transmission of the signal.

25 Claims, 5 Drawing Sheets

DATA TRANSMISSION METHOD FOR HOST AND DATA RECEPTION METHOD FOR MULTIFUNCTION DEVICE

CLAIM OF PRIORITY

This application makes reference to, incorporates the same herein, and claims all benefits accruing under 35 U.S.C. §119 from an application for *DATA TRANSMISSION METHOD OF HOST AND DATA RECEPTION METHOD OF MULTIFUNCTION DEVICE* earlier filed in the Korean Industrial Property Office on the $23^{rd}$ of Sep. 1996 and there duly assigned Ser. No. 41715/1996.

BACKGROUND OF THE INVENTION

1. Technical Field

The present invention relates to a multifunction device and, more specifically, to a method for transmitting/receiving data between a host and a multifunction device.

2. Related Art

Conventionally, a multifunction device has a mode for the performance of various functions of a general printer. For example, the multifunction device can include a facsimile system mode, a copying machine mode, and a scanner mode.

The multifunction device, as described above, and a host are connected to each other by a single parallel port. The host transmits data in correspondence to the various modes of the multifunction device through a single parallel port to the multifunction device. Namely, in the case where the multifunction device has a printer mode, a facsimile system mode, a copying machine mode, and a scanner mode, the host can transmit print data, data for facsimile system transmission, data for copying, and data for scanning via the single parallel port.

A situation wherein a user desires to use the multifunction device in a specific mode by using the multifunction device and a host will be explained hereinafter. First of all, the user operates the host so as to enable the host to transmit data in correspondence to the specific mode to the multifunction device. Then, the multifunction device initializes a specific mode in response to the data.

A first portion of the data comprises control data and has a single format, and the multifunction device checks the format and converts the mode in correspondence with the kinds of data inputted.

However, the conventional multifunction device cannot receive data for other modes once it is set to the specific mode. For instance, once the multifunction device is set to the printer mode and is involved in a printing operation, if the host transmits scanner data to the multifunction device, the data stream is interrupted and the multifunction device is down. At this moment even if the host is rebooted, the multifunction device does not return to the printer mode.

As stated previously, when data of another mode is inputted in the state where the conventional multifunction device operates in the specific mode, there is a problem in that the data stream is interrupted and the multifunction device is down.

Also, in the event that the multifunction device is down for the above reason, there is an inconvenience in that the multifunction device does not return to the original mode even if the host is rebooted.

The following patents are representative of the prior art relative to multifunction devices and communication therewith: U.S. Pat. No. 5,530,558 to Bachman, entitled *Interface Circuit For Utilizing A Facsimile Coupled to A PC As A Scanner Or Printer*, U.S. Pat. No. 5,511,150 to Beaudet et al., entitled *Copier/Printer With Improved Productivity*, U.S. Pat. No. 5,359,425 to Maehara et al., entitled *Image Recording Apparatus For Selectively Performing A Printer Mode And A Scanner Mode*, U.S. Pat. No. 5,365,364 to Taylor, entitled *Optical Scanner And Printer*, U.S. Pat. No. 5,361,134 to He et al., entitled *Integrated Multifunctional Document Processing System For Faxing, Copying, Printing, And Scanning Document Information*, U.S. Pat. No. 4,414,579 to Dattilo et al., entitled *Information Transmitting And Receiving Station Utilizing A Copier-Printer*, U.S. Pat. No. 5,544,045 to Garland et al., entitled *Unified Scanner Computer Printer*, U.S. Pat. No. 5,459,579 to He et al., entitled *Multifunctional Document Processing System For Receiving Document Signals From a Local Or A Remote Device*, U.S. Pat. No. 5,396,345 to Motoyama, entitled *Multi-Function Machine For Combining And Routing Image Data*, and U.S. Pat. No. 5,233,167 to Markman et al., entitled *Multi-Function Terminal*.

While each of the patents listed above relates to multifunction devices and/or communication therewith, each of the arrangements and methods disclosed in those patents is burdened by the disadvantages set forth above.

SUMMARY OF THE INVENTION

It is an object of the present invention to provide a data transmission method for a host and a data reception method for a multifunction device, and in particular a method wherein data of one mode is received from the host even when the multifunction device is performing in a different mode and then returns again to a previous mode after reception of the data of the one mode, thereby providing no damage in operation of the previous mode.

In order to achieve the above object, the present invention is provided with a data transmission method for a host connected to a multifunction device, comprising the steps of: detecting a mode of the multifunction device corresponding to data in response to a data transmission command sent to the multifunction device; transmitting a signal indicative of the detected mode to the multifunction device; and transmitting the data to the multifunction device after transmission of the signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DESCRIPTION OF THE PREFERRED EMBODIMENT(S)

Figure 1:
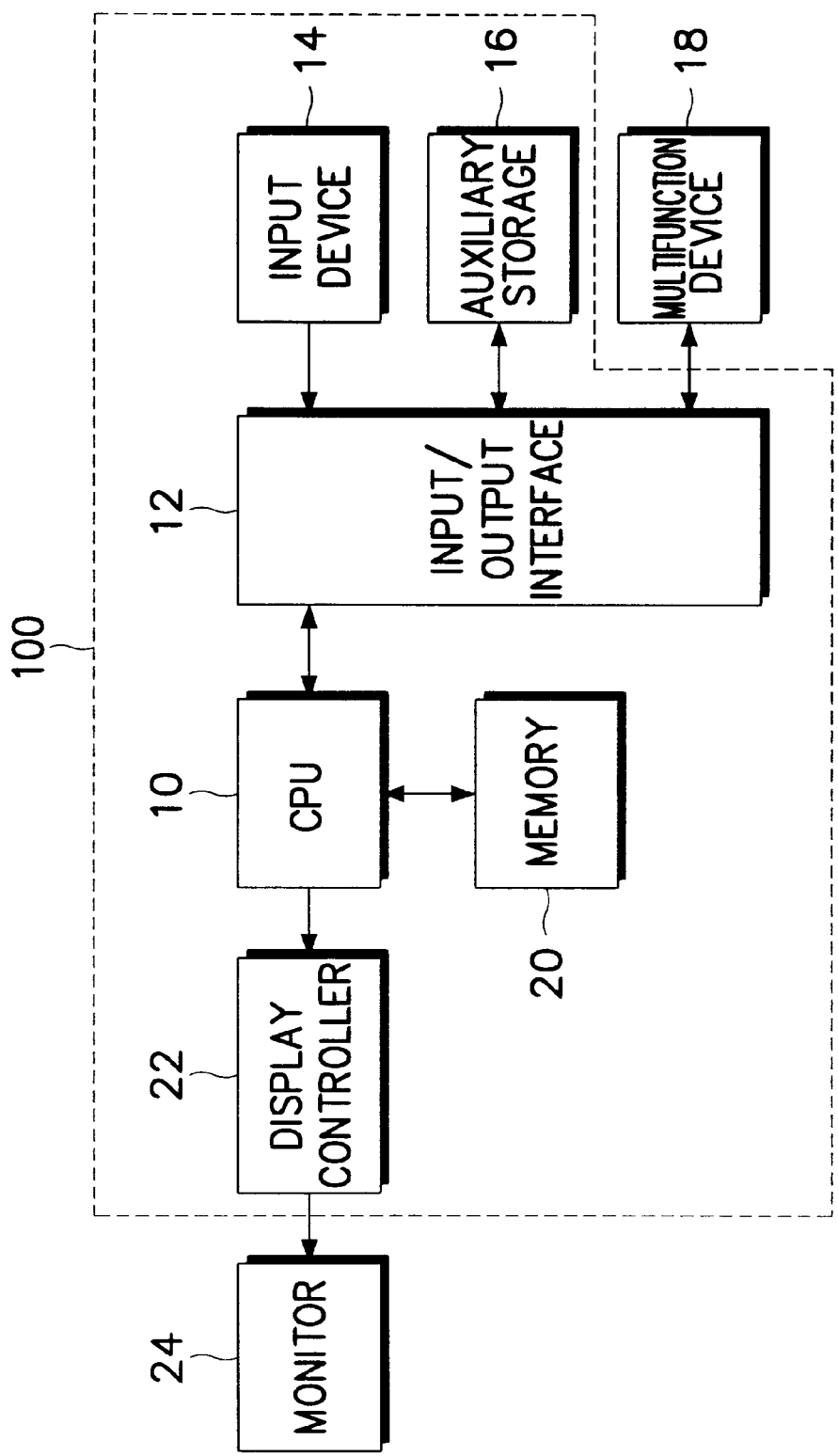
FIG. 1 is a block diagram showing a conventional host.

Hereinafter, a preferred embodiment of the present invention will be concretely explained with reference with accompanying drawings. Most of all, throughout the drawings, it is noted that the same reference numerals or letters will be used to designate like or equivalent elements having the same function. Further, a detailed description of known functions and constructions will be avoided in order not to obscure the subject matter of the present invention.

FIG. 1 is a block diagram showing a conventional host 100. With reference to FIG. 1, the CPU (central processing unit) 10 of the conventional host 100 performs a set program and the host 100 controls an overall program. An input/output interface 12 interfaces signals between the CPU 10 and an auxiliary storage 16, an input device 14, and an output device (such as multifunction device 18). The input device 14 is a device for inputting all kinds of information or commands to the CPU 10, and can be (for example) a keyboard, a mouse, etc. The auxiliary storage 16 can be a hard disk drive or a floppy disk drive. The multifunction device 18, as the output device, can be a printer or a plotter. The input/output interface 12 and the multifunction device 18 use a centronics parallel interface. The centronics parallel interface includes a line which is not used when data are transmitted from the host 100 to peripheral devices. By way of example, a line for transmitting a signal $\overline{\text{SELECTIN}}$ of the centronics parallel interface and a line for transmitting a signal $\overline{\text{AUTOFD}}$ thereof are not used upon transmitting data from the host 100 to peripheral devices. Accordingly, the data are separately transmitted by converting the polarity of the above signal in a preferred embodiment of the present invention. Further, since the multifunction device 18 has a printer mode and a scanner mode, and is described as an example in a preferred embodiment of the present invention, separate transmission of print data and scanner data by using only the signal $\overline{\text{SELECTIN}}$ will be given as an example.

In FIG. 1, a display controller 22 displays various information received from the CPU 10 on a monitor 24 under the control of the CPU 10. A memory 20 stores a performance program of the CPU 10 and temporarily stores the processing data of the CPU 10. The memory 20 includes a ROM (read only memory) and a RAM (random access memory).

In following description, the present invention is applied to the multifunction device 18 having a printer mode and a scanner mode, as will be explained hereinafter.

Figure 2:
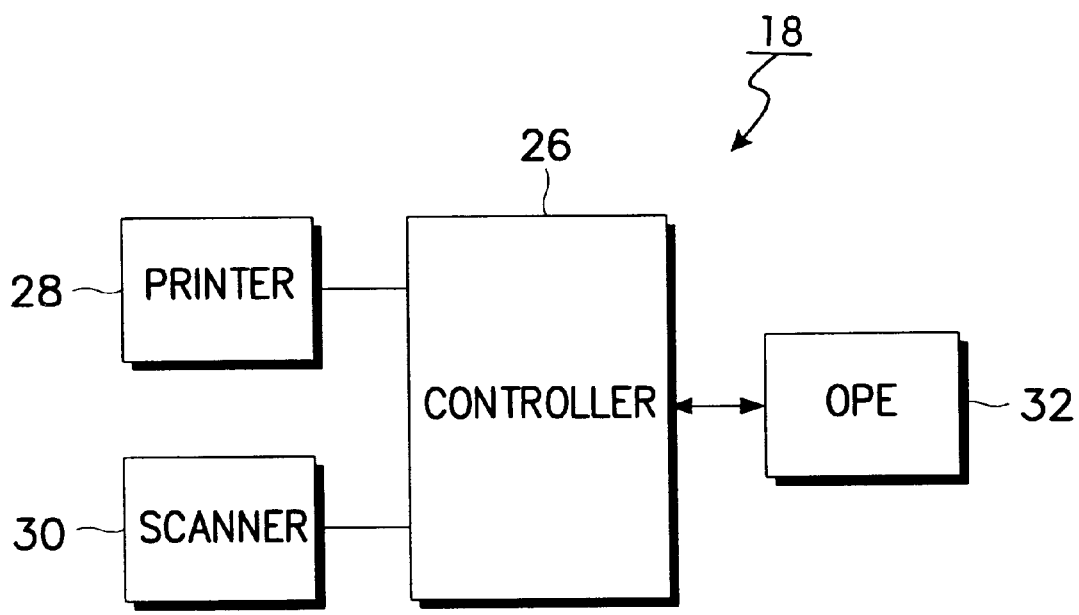
FIG. 2 is a block diagram showing the multifunction device of FIG. 1.

FIG. 2 is a block diagram showing the multifunction device 18 of FIG. 1, where a controller 26 exercises overall control of the multifunction device 18 and includes memories such as a ROM and a RAM. A printer 28 and a scanner 30 perform respective functions under the control of the controller 26. An OPE (operational panel equipment) 32 has a plurality of keys for setting each function and for inputting various commands, and a display device (not shown in FIG. 2) displays the information according to the operation of the multifunction device 18.

Figure 3:
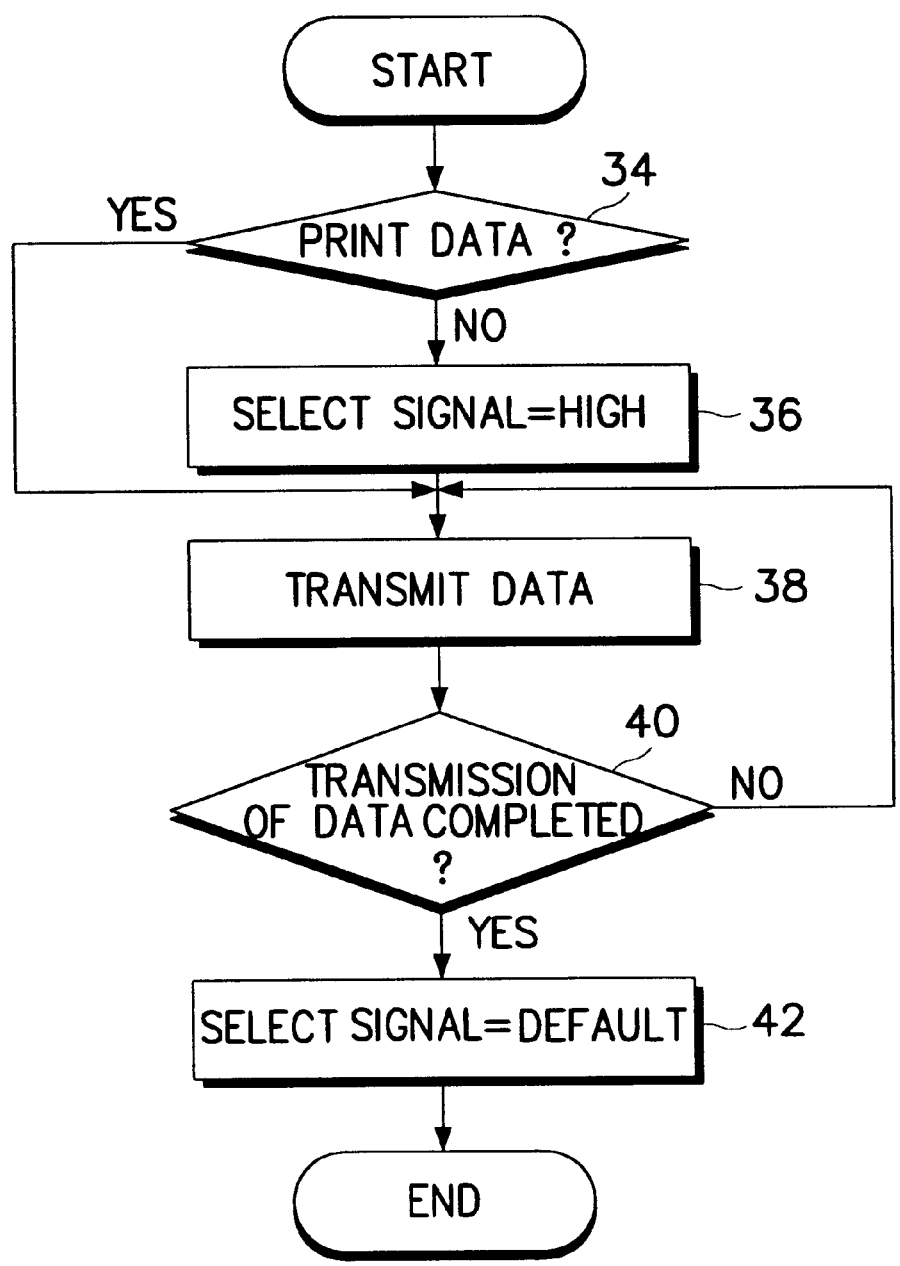
FIG. 3 is a flowchart showing a data transmission method for a host according to an embodiment of present invention.

FIG. 3 is a flow chart showing a data transmission method for a host according to an embodiment of present invention. Thus, an explanation of the data transmission method according to an embodiment of the present invention will be given hereinafter with reference to FIG. 3. Firstly, when the data are transmitted from the host 100 to the multifunction device 18, the CPU 10 of the host 100 performs step 34. In step 34, the CPU 10 checks whether or not the print data are inputted. If the print data were inputted, the CPU 10 performs step 38, and transmits the data to the multifunction device 18. However, when the print data were not inputted (that is, when the scanner data were inputted), the CPU 10 performs step 36 by converting the signal $\overline{\text{SELECTIN}}$ of the centronics parallel interface into a logic high state and transmitting the converted signal. Then, the signal $\overline{\text{SELECTIN}}$ is maintained in a default state, that is, a logic low state upon initialization. Thereafter, when transmission of the signal $\overline{\text{SELECTIN}}$ is completed, the CPU 10 performs the above step 38. When the data transmitted to the multifunction device 18 are print data, the state of the signal $\overline{\text{SELECTIN}}$ is default (logic low state). To the contrary, when the data transmitted to the multifunction device 18 are scanner data, the signal $\overline{\text{SELECTIN}}$ is in the logic high state.

After that, the CPU performs step 40. In step 40, the CPU 10 checks whether or not the transmission of the data is completed. If the transmission of the data was not completed, the CPU 10 returns to and performs the aforesaid step 38. However, when the transmission of the data was completed, the CPU 10 performs step 42, thereby converting the signal into the default (logic low state).

Figure 4:
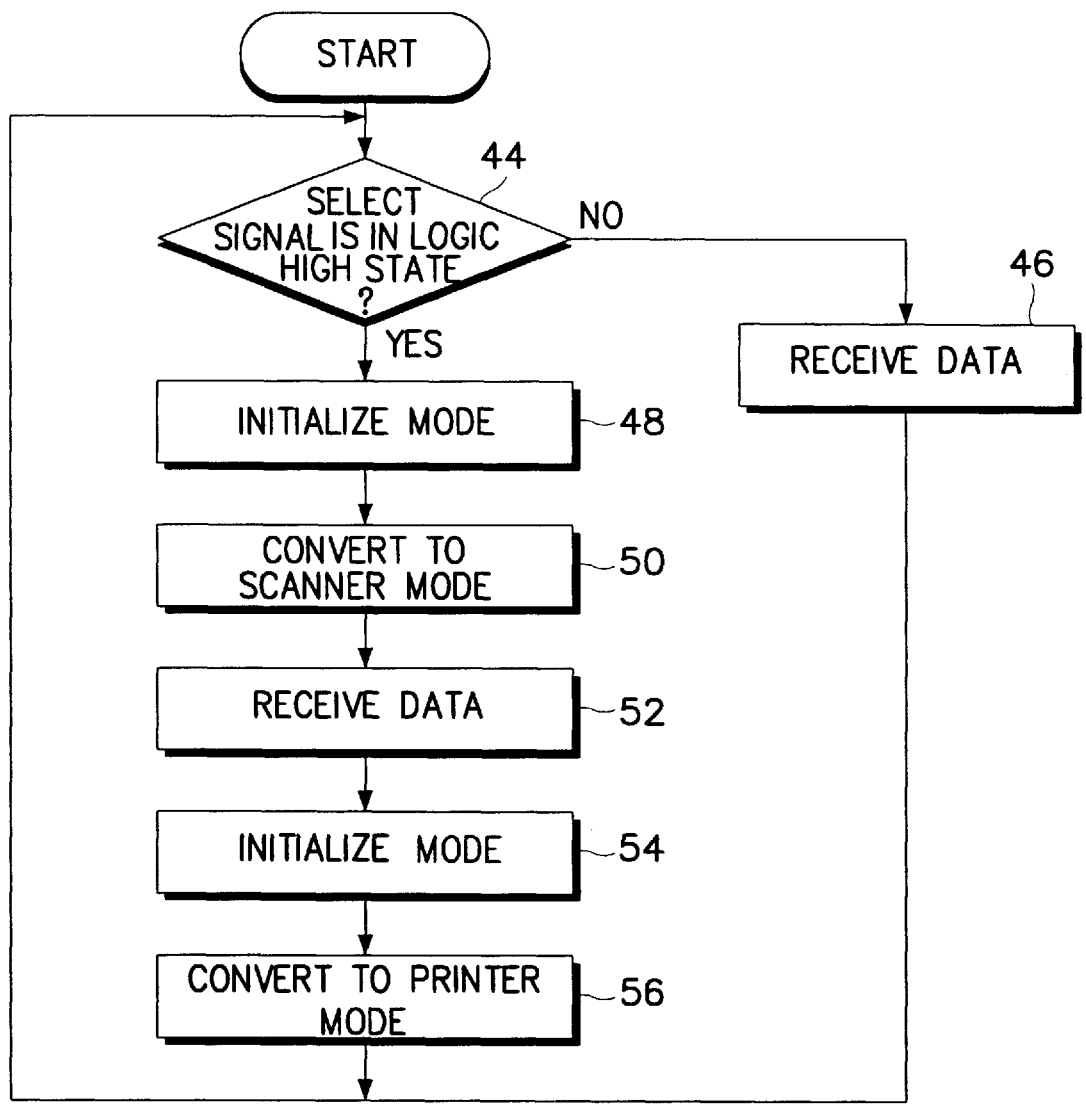
FIGS. 4 and 5 are flowcharts showing a data reception method for a multifunction device according to an embodiment of the present invention.
Figure 5:
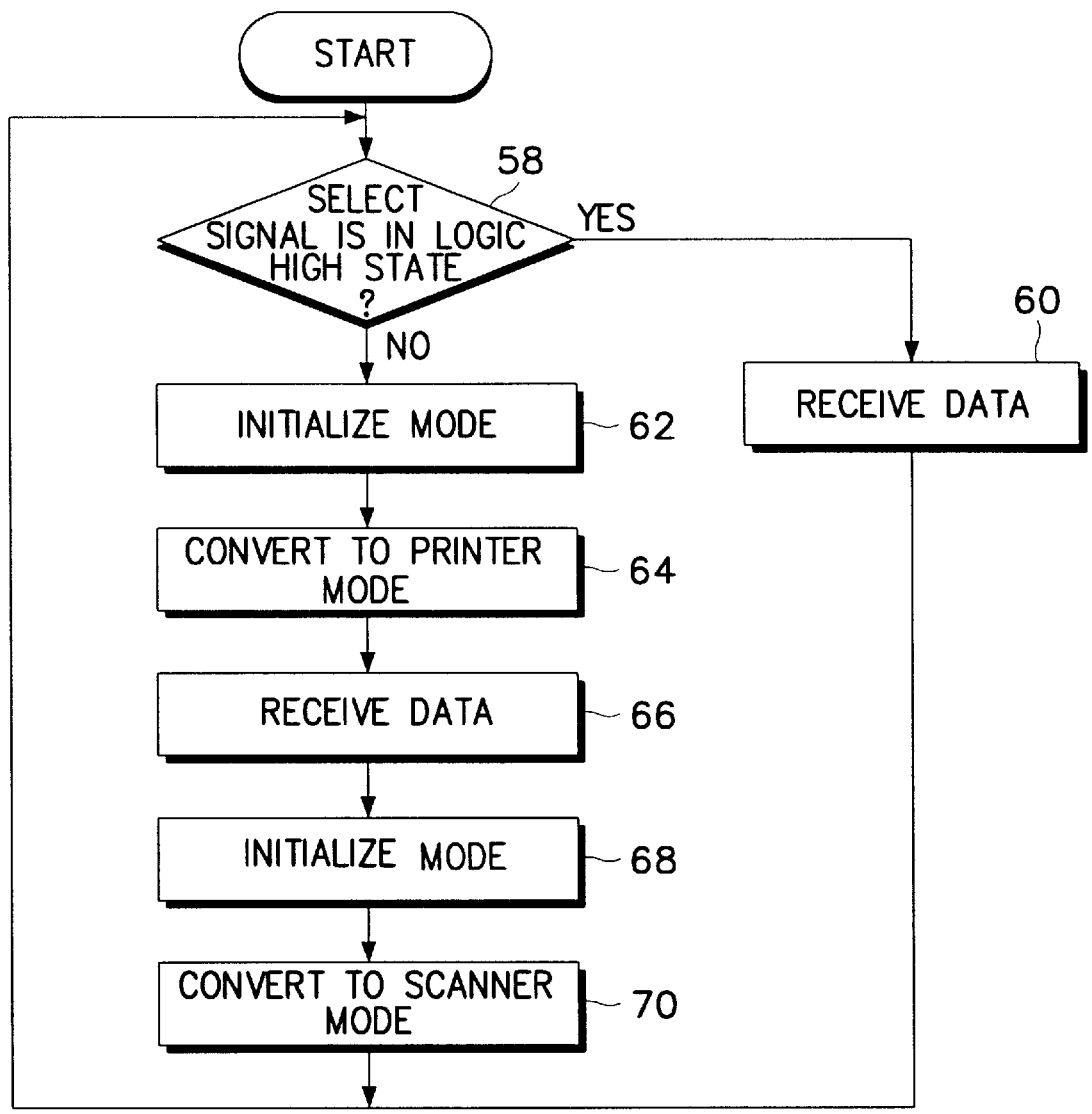

FIGS. 4 and 5 are flow charts showing a data reception method for the multifunction device according to an embodiment of the present invention, wherein FIG. 4 corresponds to the case where the multifunction device 18 performing the data transmission method is in the printer mode. The controller 26 of the multifunction device 18 in the printer mode performs step 44 when the data are transmitted from the host 100.

In the foregoing step 44, the controller 26 detects the state of the signal $\overline{\text{SELECTIN}}$. The controller 26 performs step 48 when the signal $\overline{\text{SELECTIN}}$ is in the logic high state. Otherwise, the controller 26 performs step 46 when the state of the signal $\overline{\text{SELECTIN}}$ is default (logic low). In the above step 46, the controller 26 receives the data inputted from the host 100 and processes the received data. In this case, the received data are the print data. When the reception of the data is completed, the controller 26 stands by until the data are again transmitted from the host 100.

In the above step 48, the controller 26 initializes the mode of the multifunction device 18. When the mode of the multifunction device 18 is initialized, the controller 26 performs step 50. In the above step 50, the controller 26 sets the mode of the multifunction device 18 to the scanner mode. After completion of step 50, the controller 26 performs step 52, thereby receiving the data transmitted from the host 100 and processing the received data. In this case, the received data are the scanner data.

When the reception of the data is completed, the controller 26 initializes the mode of the multifunction device 18 in step 54. After that, the controller 26 performs step 56, so that the mode of the multifunction device 18 is converted into the printer mode. Following conversion of the mode into the printer mode, the controller 26 stands by until the data are transmitted from the host 100.

When the scanner data are transmitted to a multifunction device 18 which is in the printer mode, the multifunction device 18 converts the mode into the scanner mode and receives the data, and then converts the scanner mode of the multifunction device 18 into the printer mode. Accordingly, malfunction of the multifunction device 18 due to the difference between the respective data streams of the print data and the scanner data can be prevented.

FIG. 5 corresponds to the case where the multifunction device 18 performing the data transmission/reception method of the present invention is in the scanner mode. The controller 26 of the multifunction device 18 set to the scanner mode performs step 58 when the data are transmitted from the host 100.

In the foregoing step 58, the controller 26 detects the state of the signal $\overline{\text{SELECTIN}}$. At this moment, the controller 26 performs step 60 when the signal $\overline{\text{SELECTIN}}$ is in the logic high state. Otherwise, the controller 26 performs step 62 when the state of the signal $\overline{\text{SELECTIN}}$ is default (logic low). In the above step 60, the controller 26 receives the data inputted from the host 100 and processes the received data. In this case, the received data are scanner data. When the reception of the data are completed, the controller 26 stands by until the data are again transmitted from the host 100.

In the above step 62, the controller 26 initializes the mode of the multifunction device 18. When the mode of the multifunction device 18 is initialized, the controller 26 performs step 64. In above step 64, the controller 26 converts the mode of the multifunction device 18 into the printer mode. After completion of the step 64, the controller 26 performs step 66, by receiving the data transmitted from the host 100 and processing the received data. In this case, the received data are the print data.

When the reception of the data is completed, the controller 26 initializes the mode of the multifunction device 18 in step 68. After that, the controller 26 performs step 70, so that the mode of the multifunction device 18 can be converted into the printer mode. Following conversion of the mode into the printer mode, the controller 26 stands by until the data are transmitted from the host 100.

When the print data are transmitted to the multifunction device 18 in the scanner mode, the multifunction device 18 converts the mode into the printer mode and receives the data, and then converts the printer mode of the multifunction device 18 into the scanner mode. Accordingly, the malfunction of the multifunction device 18 due to the difference between the respective data streams of the print data and the scanner data can be prevented.

As mentioned previously, since the present invention provides for separate transmission of data from the host 100 to the multifunction device 18, the data of the other mode can be provided by the host 100 even when the multifunction device 18 is performing a different, specific mode. After completion of the reception of the data, the multifunction device again returns to the previous state, thereby advantageously having no influence on the operation in the previous mode.

Therefore, it should be understood that the present invention is not limited to the particular embodiment disclosed herein as the best mode contemplated for carrying out the present invention, but rather that the present invention is not limited to the specific embodiments described in this specification, except as defined in the appended claims.

What is claimed is:

1. A data transmission method for a host connected to a multifunction device, comprising the steps of:
   determining a type of data to be transmitted to said multifunction device;
   determining whether a data mode of said multifunction device corresponds to the type of data to be transmitted to said multifunction device;
   transmitting a mode signal corresponding to said data to be transmitted to said multifunction device when said data mode of said multifunction device does not correspond to said type of data to be transmitted to said multifunction device; and
   transmitting the data to said multifunction device.

2. The method as recited in claim 1, further comprising the steps of determining when the transmission of the data is completed and, when the transmission of the data is completed, setting said mode signal to a default setting.

3. The method as recited in claim 1, further comprising the step of providing a first transmission line between said host and said multifunction device for transmission of said data therebetween, and a second transmission line between said host and said multifunction device for transmission of said mode signal therebetween.

4. The method as recited in claim 1, further comprising the step, prior to the step of determining the type of data to be transmitted, of setting said multifunction device to a default mode.

5. The method as recited in claim 4, wherein the default mode of the multifunction device comprises a printer mode.

6. The method as recited in claim 4, wherein the default mode of the multifunction device comprises a scanner mode.

7. The method as recited in claim 1, wherein at least one of said determining steps is preformed by the host.

8. The method as recited in claim 7, wherein the default mode of the multifunction device comprises a printer mode.

9. The method as recited in claim 7, wherein the default mode of the multifunction device comprises a scanner mode.

10. A data reception method for a multifunction device connected to a host, comprising the steps of:
    receiving a mode signal representative of a specific mode of data to be received from said host;
    determining whether said mode of said multifunction device coincides with the specific mode of the data to be received from said host;
    receiving data from said host without changing said mode of said multifunction device when said mode of said multifunction device coincides with the specific mode of the data to be received from said host;
    setting said multifunction device to said specific mode based on said mode signal when said mode of said multifunction device does not coincide with the specific mode of the data to be received from the host; and
    receiving the data from said host.

11. The method as recited in claim 10, further comprising the step of providing a first transmission line between said host and said multifunction device for transmission of said data therebetween, and a second transmission line between said host and said multifunction device for transmission of said mode signal therebetween.

12. The method as recited in claim 10, further comprising the step, prior to said step of receiving the mode signal, of setting said multifunction device to a default mode.

13. The method as recited in claim 10, further comprising the step, after said step of receiving the data from said host, of reinitializing said multifunction device to an original default mode.

14. The method as recited in claim 10, wherein said determining step is performed by the host.

15. A data transmission method for a host connected to a multifunction device, comprising the steps of:
    determining a type of data to be transmitted to the multifunction device;
    when the type of data to be transmitted to the multifunction device coincides with a default mode setting of the multifunction device, transmitting the data to the multifunction device;
    when the type of data to be transmitted to the multifunction device does not coincide with the default mode setting of the multifunction device, transmitting a mode signal to the multifunction device converting a mode of the multifunction device so that it coincides with the type of data to be transmitted to the multifunction device, and then transmitting the data to the multifunction device; and
    after the transmission of the data is completed, resetting the mode of the multifunction device to the default mode setting.

16. The method as recited in claim 15, further comprising the step of providing a first transmission line between said host and said multifunction device for transmission of said data therebetween, and a second transmission line between said host and said multifunction device for transmission of said mode signal therebetween.

17. The method as recited in claim 15, wherein the default mode of the multifunction device comprises a printer mode.

18. The method as recited in claim 15, wherein the default mode of the multifunction device comprises a scanner mode.

19. The method as recited in claim 15, further comprising the step, prior to said step of receiving the mode signal, of setting said multifunction device to a default mode.

20. A data reception method for a multifunction device having a default mode and connected to a host, comprising the steps of:

determining whether the data to be received from the host is of a type which coincides with the default mode of the multifunction device;

when the data to be received from the host is of the type which coincides with the default mode of the multifunction device, receiving the data from the host; and when the data to be received from the host is of a type which does not coincide with the default mode of the multifunction device, converting the mode of the multifunction device to a mode which coincides with the type of data to be received from the host, and then receiving the data from the host; and after the data has been received from the host, converting the mode of the multifunction device to the default mode.

21. The method as recited in claim 20, wherein the default mode of the multifunction device comprises a printer mode.

22. The method as recited in claim 20, wherein the default mode of the multifunction device comprises a scanner mode.

23. The method as recited in claim 20, further comprising the step of providing a first transmission line between said host and said multifunction device for transmission of said data therebetween, and a second transmission line between said host and said multifunction device for transmission of said mode signal therebetween.

24. The method as recited in claim 20, further comprising the step, prior to said step of receiving the mode signal, of setting said multifunction device to a default mode.

25. The method as recited in claim 20, wherein each of said converting step comprises transmitting a mode signal from the host to the multifunction device.

* * * * *